(12) United States Patent
Schaffrath et al.

(10) Patent No.: US 10,012,143 B2
(45) Date of Patent: Jul. 3, 2018

(54) INTERNAL COMBUSTION ENGINE WITH SETTABLE VARIABLE COMPRESSION RATIO AND WITH A SWITCHING MODULE

(71) Applicant: FEV GMBH, Aachen (DE)

(72) Inventors: Uwe Schaffrath, Herzogenrath (DE); Andre Prinz, Köln (DE)

(73) Assignee: FEV GMBH, Aachen (DE)

( * ) Notice: Subject to any disclaimer, the term of this patent is extended or adjusted under 35 U.S.C. 154(b) by 232 days.

(21) Appl. No.: 15/051,769

(22) Filed: Feb. 24, 2016

(65) Prior Publication Data

US 2016/0245331 A1    Aug. 25, 2016

(30) Foreign Application Priority Data

Feb. 25, 2015   (DE) .......................... 10 2015 203 378

(51) Int. Cl.
  *F02D 15/02*       (2006.01)
  *F02B 75/04*       (2006.01)
  (Continued)

(52) U.S. Cl.
  CPC ............ *F02B 75/045* (2013.01); *F02D 15/02* (2013.01); *F16K 11/07* (2013.01); *F16K 27/041* (2013.01);
  (Continued)

(58) Field of Classification Search
  CPC ...... F02B 75/045; F16K 27/041; F16K 11/07; F02D 15/02; F16C 23/10; F16C 7/06
  (Continued)

(56) References Cited

U.S. PATENT DOCUMENTS 6,497,203 B1 * 12/2002 Rao ....................... F02B 75/045
                                                                     123/48 B
2004/0231619 A1 * 11/2004 Hirano .................. F02B 75/044
                                                                     123/48 B
(Continued)

FOREIGN PATENT DOCUMENTS

DE      102005055199 A1    5/2007
DE      102011108790 A1    1/2013
(Continued)

*Primary Examiner* — Marguerite McMahon
(74) *Attorney, Agent, or Firm* — Dinsmore & Shohl LLP

(57) ABSTRACT

The invention relates to an internal combustion engine (1) having a settable variable compression ratio and having a connecting rod (3), which connecting rod has an adjustment mechanism (4) for the adjustment of the settable variable compression ratio, a first hydraulic line (5), a second hydraulic line (6), a hydraulic outflow duct (47) and a switching module (21) for the switching of the adjustment mechanism (4), wherein the switching module (21) is arranged on the connecting rod (3) and a first position of the switching module (21) corresponds to a first compression ratio and a second position of the switching module (21) corresponds to a second compression ratio that differs from the first compression ratio, wherein the switching module (21) has a switching element (22) and a sleeve (23) surrounding the switching element (22), wherein the switching element (22) and the sleeve (23) are movable relative to one another, and the switching element (22) has a recess (36) and an edge region (37) bordering the recess (36), wherein, in the first position of the switching module (21), the recess (36) and the sleeve (23) connect the first hydraulic line (5) in fluid-conducting fashion to the hydraulic outflow duct (47), and the edge region (37) and the sleeve (23) shut off a fluidic connection between the second hydraulic line (6) and the hydraulic outflow duct (47), and in the second position of the switching module (21), the recess (36) and the sleeve (23)

(Continued)

connect the second hydraulic line (6) in fluid-conducting fashion to the hydraulic outflow duct (47), and the edge region (37) and the sleeve (23) shut off a fluidic connection between the first hydraulic line (5) and the hydraulic outflow duct (47).

12 Claims, 7 Drawing Sheets

(51) Int. Cl.
  *F16K 11/07* (2006.01)
  *F16K 27/04* (2006.01)
  *F16C 7/06* (2006.01)
  *F16C 23/10* (2006.01)
(52) U.S. Cl.
  CPC ............... *F16C 7/06* (2013.01); *F16C 23/10* (2013.01); *F16C 2360/22* (2013.01)

(58) Field of Classification Search
  USPC .................................. 123/48 B, 78 E, 197.3
  See application file for complete search history.

(56) References Cited

U.S. PATENT DOCUMENTS

| 2015/0075497 A1* | 3/2015 | Hutzelmann | F02B 75/044 |
| | | | 123/48 A |
| 2015/0152794 A1* | 6/2015 | Paul | F02D 15/02 |
| | | | 123/48 R |
| 2015/0233288 A1* | 8/2015 | Paul | F02B 75/045 |
| | | | 123/48 B |

FOREIGN PATENT DOCUMENTS

| WO | 2014019683 A1 | 2/2014 |
| WO | 2014019684 A1 | 2/2014 |

* cited by examiner

INTERNAL COMBUSTION ENGINE WITH SETTABLE VARIABLE COMPRESSION RATIO AND WITH A SWITCHING MODULE

CROSS-REFERENCE TO RELATED APPLICATIONS

This application claims priority of German Patent Application No. 10 2015 203 378.3 filed Feb. 25, 2015.

FIELD OF THE INVENTION

The invention relates to an internal combustion engine having a settable variable compression ratio and having a connecting rod. The connecting rod has an adjustment mechanism for the adjustment of the settable variable compression ratio, a first hydraulic line, a second hydraulic line, a hydraulic outflow and a switching module for the switching of the adjustment mechanism. The switching module is arranged on the connecting rod, wherein a first position of the switching module corresponds to a first compression ratio and a second position of the switching module corresponds to a second compression ratio that differs from the first compression ratio.

BACKGROUND OF THE INVENTION

An internal combustion engine of said type is known from DE 10 2011 108 790 A1, WO 2014/019684 A1 and WO 2014/019683 A1. In the case of the internal combustion engine as per DE 10 2011 108 790 A1, the settable variable compression ratio is controlled by way of the opening-up of a first and of a second hydraulic line. The opening-up of the first hydraulic line releases a blockage of a movement of the adjustment mechanism to a first position of the adjustment mechanism, which first position corresponds to the first compression ratio of the internal combustion engine. The shutting-off and opening-up of the respective hydraulic lines is realized, according to DE 10 2011 108 790 A1, by way of a slide valve. To avoid excessive leakage losses between the hydraulic lines and the slide valve, the recesses for the slide valve within the connecting rod are manufactured in highly precise fashion. Such demands on manufacturing precision necessitate a relatively complex production method for the connecting rod.

SUMMARY OF THE INVENTION

It is therefore an object of the present invention to provide an internal combustion engine which permits relatively simple production of a connecting rod with an adjustment mechanism for a settable variable compression ratio of an internal combustion engine.

Said object is achieved according to the invention by way of an internal combustion engine having the features of claim 1 and by way of a method having the features of claim 12. Advantageous features, embodiments and refinements will emerge from the following description, from the figures and from the claims, wherein individual features from one embodiment are not restricted thereto. Rather, one or more features from one embodiment may be combined with one or more features of another embodiment to form further embodiments. Also, the wordings of independent claims 1 and 12 in their filed form serve merely as a first draft of the wordings of the subjects to be claimed. One or more features of the wordings may therefore be exchanged or omitted, but likewise also additionally supplemented. Also, the features specified on the basis of one specific exemplary embodiment may likewise be used generally or in other exemplary embodiments, in particular in other applications.

To provide an internal combustion engine which permits relatively simple production of a connecting rod with an adjustment mechanism for adjusting a settable variable compression ratio of the internal combustion engine, an internal combustion engine having a settable variable compression ratio and having a connecting rod is proposed. The connecting rod has an adjustment mechanism for the adjustment of the settable variable compression ratio, a first hydraulic line, a second hydraulic line, a hydraulic outflow and a switching module for the switching of the adjustment mechanism. The switching module is arranged on the connecting rod, wherein a first position of the switching module corresponds to a first compression ratio and a second position of the switching module corresponds to a second compression ratio that differs from the first compression ratio.

It is provided that the switching module has a switching element and a sleeve surrounding the switching element. The switching element and the sleeve are movable relative to one another, wherein the mobility relative to one another is realized preferably by way of a clearance fit between the switching element and the sleeve. The switching element has a recess and an edge region bordering the recess, wherein, in the first position of the switching module, the recess and the sleeve connect the first hydraulic line in fluid-conducting fashion to the hydraulic outflow, and the edge region and the sleeve shut off a fluidic connection between the second hydraulic line and the hydraulic outflow. The hydraulic outflow may be formed as a duct in the connecting rod or as an opening of the connecting rod towards the interior of a crankcase of the internal combustion engine. The recess may be manufactured by milling, drilling, grinding or by way of some other, in particular chip-removing, machining of the switching element.

The edge region and the sleeve preferably form a contact zone which encircles the switching element and which seals off the second hydraulic line with respect to the hydraulic outflow when the switching module is in the first position. In the second position of the switching module, the recess and the sleeve connect the second hydraulic line in fluid-conducting fashion to the hydraulic outflow, and the edge region and the sleeve shut off a fluidic connection between the first hydraulic line and the hydraulic outflow. The edge region and the sleeve preferably form a contact zone which encircles the switching element and which seals off the first hydraulic line with respect to the hydraulic outflow when the switching module is in the second position.

In one refinement, it may be provided that a second edge region of the switching element delimits the recess and, in the second position, forms with the sleeve a contact zone which encircles the switching element and which serves for sealing off the first hydraulic line with respect to the hydraulic outflow.

In a refinement, the sleeve is immovable relative to the connecting rod and the switching element is displaceable relative to the connecting rod. For example, the sleeve may be fixed relative to the connecting rod by way of an interference fit or by way of a fastening element, preferably a stop pin. In an advantageous embodiment, the sleeve has a cylindrical external shell, which tapers conically slightly along a longitudinal axis of the sleeve, and the connecting rod has a corresponding cylindrical, slightly conically tapering receptacle for receiving the sleeve. It is preferably the case that the shell and the receptacle form an interference fit in the installed state of the sleeve on or in the connecting rod.

One advantageous embodiment of the invention provides that the sleeve has at least one first passage and one second passage, wherein the first passage is arranged offset with respect to the second passage in a projection plane which is perpendicular to a longitudinal axis of the sleeve. Such an offset increases the spacing between the first passage and the second passage and thus a sealing length between the first and the second passage, wherein a sealing length is defined by the length of a path along which a fluid flows from the first passage to the second passage. In the context of the invention, the first passage is assigned to the first hydraulic line and forms a fluid passage for a fluid which flows from the first hydraulic line into the switching module. The second passage forms a fluid passage for the fluid flowing out of the switching module to the hydraulic outflow. The first and the second passage are preferably in the form of bores. In a further refinement, at least one of the two passages is punched or milled into the sleeve. The second passage is preferably in the form of an outflow bore.

In a particular embodiment, the first passage is formed as a first inflow bore and a third passage of the sleeve is formed as a second inflow bore, wherein the third passage or the second inflow bore is assigned to the second hydraulic line and forms a fluid passage for a fluid which flows from the second hydraulic line into the switching module. It is particularly advantageously the case that the recess of the switching element connects the first inflow bore of the sleeve to the outflow bore when the switching module is in the first position, and connects the second inflow bore to the outflow bore when the switching module is in the second position. In the same way, the edge region of the switching element shuts off a fluidic connection between the second inflow bore and the outflow bore of the sleeve when the switching module is in the first position, and shuts off a fluidic connection between the first inflow bore and the outflow bore of the sleeve when the switching module is in the second position.

Via the second passage, preferably via the outflow bore, it is possible for a fluid, preferably an engine oil, to flow back further via the hydraulic outflow, for example into the crankcase of the internal combustion engine. A further embodiment provides that the fluid flows back via the hydraulic outflow into the connecting rod, preferably further via a connecting rod bearing, into the crankshaft.

It is advantageously the case that the outflow bore is arranged offset with respect to the first and/or the second inflow bore in a projection plane which is perpendicular to the longitudinal axis of the sleeve. In comparison with an outflow bore which is not arranged offset, it is thus possible to realize a greater sealing length between the first or the second inflow bore respectively and the outflow bore.

For simpler manufacture of the connecting rod, in particular of the first hydraulic line and of the second hydraulic line of the connecting rod, the first and/or the second inflow bore of the sleeve have/has a smaller diameter than each of the first hydraulic line and the second hydraulic line of the connecting rod, preferably at the location at which the first and/or the second hydraulic line adjoins the first or the second inflow bore respectively.

The diameter of the first inflow bore and/or of the second inflow bore of the sleeve advantageously defines a throughflow speed of a fluid from the first or the second hydraulic line respectively through the first and second inflow bore respectively. The accuracy of a throughflow rate of a fluid from the corresponding hydraulic lines through the sleeve is preferably predefined by the respective tolerance of the diameter values during manufacture of the first and/or second outflow bore. In relation to the connecting rod disclosed in DE 10 2011 108 790 A1, in which a tolerance range of an outflow speed of the fluid out of the respective hydraulic lines, that is to say out of the first or of the second hydraulic line, is predefined by the tolerance of the diameter values of the respective first and second hydraulic line, the teaching according to the invention simplifies the manufacture of the connecting rod such that, under given, equal boundary conditions of the internal combustion engine, such as for example an engine speed and an oil pressure, the outflow speed of the fluid is dependent substantially on the tolerance values of the diameter of the respective inflow bores of the sleeve. This may for example simplify a design of the connecting rod such that cavitation and foaming of the fluid in the first and second hydraulic lines is prevented over broad, preferably all, engine speed and load ranges of the internal combustion engine.

By means of the embodiment according to the invention of the connecting rod and, correspondingly, of the switching module with the sleeve and the switching element, the first and the second hydraulic line can be drilled more easily, wherein here, no special requirements with regard to tolerances or surface quality have to be satisfied. All precision machining, for example for predefining a throughflow rate of the fluid from the first or from the second hydraulic line into the sleeve, is restricted to the switching element and to the sleeve, preferably to the connecting surfaces between the switching element and the sleeve.

Furthermore, by way of the smaller diameters of the first and/or second inflow bore in relation to the diameters of each of the first hydraulic line and the second hydraulic line, a throughflow aperture is formed in each case. By contrast to DE 10 2011 108 790 A1, a throughflow aperture of said type no longer has to be additionally provided within the first and second hydraulic lines, wherein furthermore, the manufacture of the connecting rod is simplified.

In a further advantageous embodiment, it is provided that the connecting rod has a stop pin by means of which the switching element, in a stop position and/or in the first and/or second position, is blocked at least in one direction. It is furthermore advantageously provided that the stop pin fixes the sleeve relative to the connecting rod. A clearance between the sleeve pushed into the connecting rod, in particular the sleeve pushed into a receptacle of the connecting rod, and the connecting rod is preferably eliminated by way of the installation of the stop pin on the connecting rod. In an advantageous refinement, it is possible for an interference fit between the sleeve and the connecting rod to be set during an installation process by way of a variable size, preferably a variable diameter, of the stop pin.

A further embodiment provides that the connecting rod has a fixing device for fixing the switching element in the first and/or second position. It is preferably the case that, in the first and/or second position of the switching element, the fixing device exerts a holding force on the switching element, which holding force holds, preferably partially blocks, the switching element in the first and/or second position. A partial blockage of the switching element is to be understood in particular to mean a blockage of a movement of the switching element in the absence of intentional switching.

The fixing device is preferably in the form of a detent spring. Here, the detent spring serves to automatically pull the switching element, beyond a certain dead centre position, into the desired first or second position and hold the switching element in said position. The detent spring may be in the form of a bending spring or a compression spring.

The detent spring preferably has a spherical end which is pressed with a holding force, generated by the spring, into a preferably shell-shaped receptacle on the switching element. In a further embodiment, the fixing device is in the form of a magnetic locking means. For example, it may be provided that, in the first or second position of the switching element, a magnetic cylindrical pin is pulled into a groove of the switching element and thereby at least partially blocks a preferably lateral movement of the switching element.

In a further embodiment, the fixing device is in the form of a hydraulic locking means. In this case, a prevailing oil pressure, which is for example transmitted from the oil pump to the connecting rod via a connecting rod bearing of the internal combustion engine, can be utilized to hold the switching element in one position, the first position or the second position. This can be ensured by virtue of the oil pressure acting on a detent element. The detent element may for example be in the form of a pin which can move perpendicular to a movement direction of the switching element and which engages with detent action, under the influence of the oil pressure, into a groove which extends on the switching element perpendicular to the movement direction of the switching element.

Furthermore, a connecting rod is proposed which has an adjustment mechanism for the adjustment of a settable variable compression ratio of an internal combustion engine, a first hydraulic line, a second hydraulic line, a hydraulic outflow and a switching module for the switching of the adjustment mechanism. The switching module is arranged on the connecting rod, wherein a first position of the switching module corresponds to a first position of the adjustment mechanism and a second position of the switching module corresponds to a second position of the adjustment mechanism that differs from the first position of the adjustment mechanism. The switching module has a switching element and a sleeve surrounding the switching element, wherein the switching element and the sleeve are movable relative to one another. Furthermore, the switching element has a recess and an edge region bordering the recess.

In the first position of the switching module, the recess and the sleeve connect the first hydraulic line in fluid-conducting fashion to the hydraulic outflow, wherein the edge region and the sleeve shut off a fluidic connection between the second hydraulic line and the hydraulic outflow. In the second position of the switching module, the recess and the sleeve connect the second hydraulic line in fluid-conducting fashion to the hydraulic outflow, wherein the edge region and the sleeve shut off a fluidic connection between the first hydraulic line and the hydraulic outflow.

In a particularly advantageous manner, the adjustment mechanism, the first hydraulic line, the second hydraulic line, the hydraulic outflow and the switching module may be provided as in the internal combustion engine described above and in all of its exemplary embodiments. Likewise, said embodiments described above may have refining features for more precise specification of the connecting rod, which features can be claimed for refinement of the connecting rod.

Furthermore, a sleeve for insertion into the connecting rod is proposed, wherein the sleeve has a receptacle for a stop pin, a first passage for the first hydraulic line, a second passage for a hydraulic outflow, and a third passage for the second hydraulic line. It is advantageously the case that at least one, the first or the third, passage is arranged offset with respect to the third passage in a projection plane which is perpendicular to the longitudinal axis of the sleeve.

Also proposed is a method for the adjustment of an adjustment mechanism using the connecting rod described above. In a first step of the method, the switching module is adjusted into the first position. In a further, second step, a fluid is conducted through the switching module, wherein the fluid is conducted by way of the recess from the first hydraulic line to the outflow bore. In a third step of the method, the adjustment mechanism is adjusted from a second position to a first position. For example, the conducting of the fluid through the switching element causes a blockage of the first fluid chamber to be eliminated, whereupon the adjustment mechanism adjusts to the first position under the influence of gas forces during the operation of an internal combustion engine.

Steps one to three are preferably performed in series, wherein an adjustment of the adjustment mechanism from the second position to the first position and an adjustment to the first compression ratio of the internal combustion engine are effected. The internal combustion engine is preferably operated with the adjustment mechanism in the first position for a desired duration. The proposed method furthermore provides a fourth step, in which the switching module is adjusted into the second position. In a fifth step, the fluid, preferably an engine oil, is conducted through the switching module, wherein the fluid is conducted by way of the recess from the second hydraulic line to the hydraulic outflow. In a sixth step, the adjustment mechanism is adjusted from the first position to the second position, preferably under the influence of inertia forces during the operation of the internal combustion engine. Steps five to six are preferably performed when the internal combustion engine is to be operated with a second compression ratio that differs from the first.

BRIEF DESCRIPTION OF THE DRAWINGS

Further advantageous embodiments and features will emerge from the following figures and from the associated description. The individual features that emerge from the figures and from the description are merely exemplary and are not restricted to the respective embodiment. Rather, one or more features from one or more figures may be combined with other features from the above description to form further embodiments. Therefore, the features are stated not as being restrictive but as being exemplary. In the figures.

DETAILED DESCRIPTION OF THE INVENTION

Figure 1:
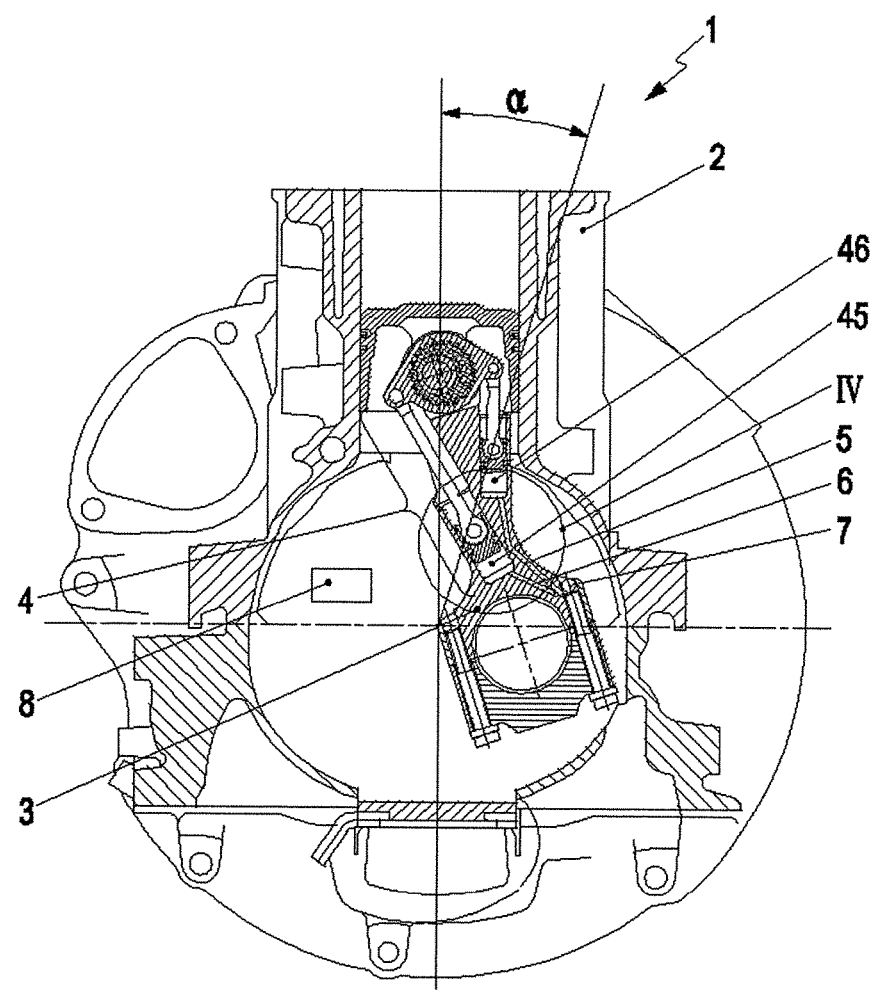
FIG. 1 shows a sectional view of an internal combustion engine having a settable variable compression ratio.

FIG. 1 shows an internal combustion engine 1 having a settable variable compression ratio, having a crankcase 2, having a connecting rod 3, an adjustment mechanism 4 for the adjustment of the settable variable compression ratio, a first hydraulic line 5, a second hydraulic line 6 and a switching module 7 for the switching of the adjustment mechanism 4, wherein the switching module 7 is arranged on or in the connecting rod 3 and a first position of the switching module 7 corresponds to a first compression ratio and a second position of the switching module 7 corresponds to a second compression ratio that differs from the first compression ratio. The switching module 7 can preferably be switched by way of a switching means 8 from a first position of the switching module into a second position and vice versa. The switching means 8 may be designed, for example, similarly to the switching means described in WO 2014/019684 A1 and WO 2014/019683 A1, with cam disk elements. The direction of rotation of a crankshaft of the internal combustion engine and of the switching module 7 is denoted by the positive rotation direction of the angle α.

The adjustment of the compression ratio of the internal combustion engine 1 by way of the adjustment mechanism 4 is realized by way of a fluid being drained either from a first working chamber 45 or from a second working chamber 46 under the action of inertia forces and/or gas forces during the operation of the internal combustion engine 1. A possible variant of the adjustment of the compression ratio is described in detail in DE 10 2005 055 199, wherein the first working chamber 45 corresponds to the working chamber 29.2 and the second working chamber 46 corresponds to the working chamber 29.1 in FIG. 1 of DE 10 2005 055 199.

The disclosure of the present application makes reference to the entire content of the applications DE 10 2005 055 199, DE 10 2011 108 790 A1, WO 2014/019684 A1 and WO 2014/019683 A1 with regard to a possible embodiment of the switching means, with regard to the hydraulic switching in the connecting rod and with regard to the design of the connecting rod and with regard to the method for the adjustment of the compression ratio.

Figure 2:
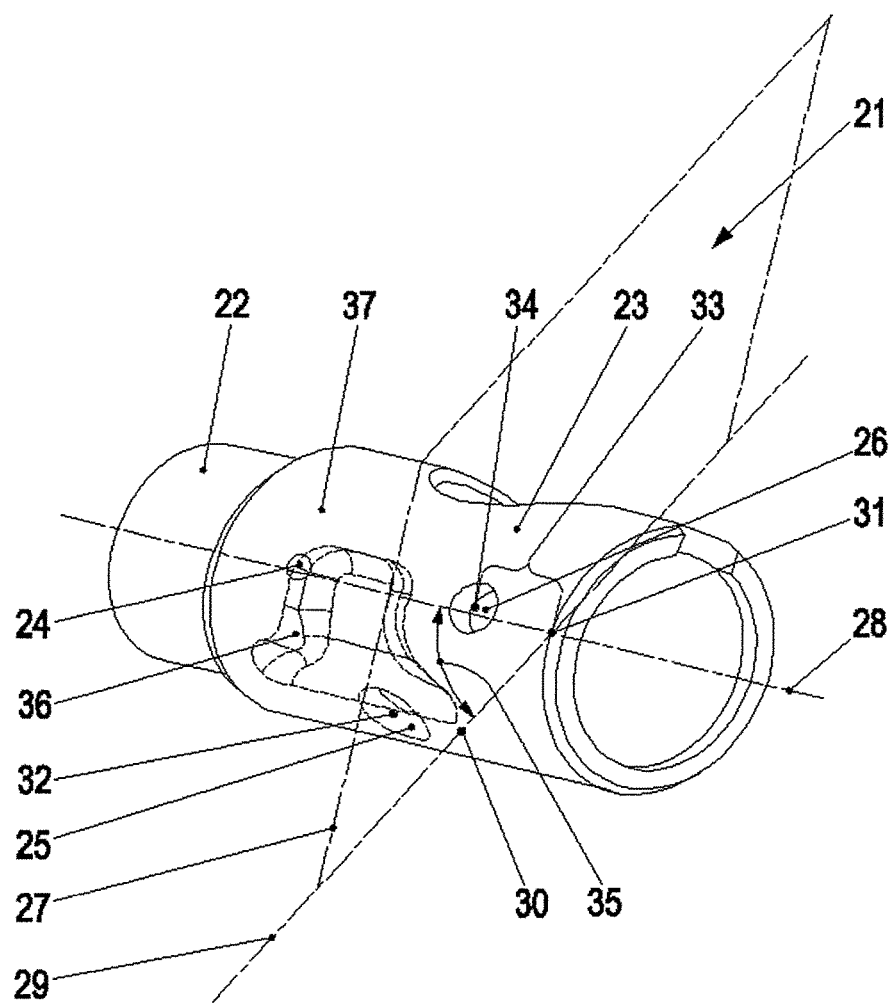
FIG. 2 shows a perspective view of a switching module having a switching element, and a sleeve surrounding the switching element in a first position.

FIG. 2 shows an embodiment of a switching module 21 having a peg-like or bolt-like switching element 22 and a sleeve 23 which surrounds the switching element 22. The switching element 22 is axially movable relative to the sleeve 23. The sleeve 23 has a first passage in the form of a first inflow bore 24, a second passage in the form of an outflow bore 25 and a third passage in the form of a second inflow bore 26.

In a projection plane 27 which runs perpendicular to a longitudinal axis 28 of the sleeve 23, there lies a first straight line 29 which intersects a projected point 30 and the longitudinal axis 28 at a point 31. The projected point 30 arises from a projection of a first central point 32 which lies on a central line of the outflow bore 25. Furthermore, a distance 33 lies in the projection plane 27, wherein the distance 33 is bounded by the point of intersection 31 and a central point 34 on a central line of the second inflow bore 26. In the embodiment of the sleeve 23 illustrated in FIG. 2, the distance 33 encloses an offset angle 35 of approximately 60 degrees with the straight line 29. In modified embodiments, the offset angle 35 may amount to 20 degrees to 30 degrees, 31 degrees to 40 degrees, 41 degrees to 50 degrees, 51 degrees to 60 degrees, 61 degrees to 70 degrees, 71 degrees to 80 degrees, 81 degrees to 90 degrees, 91 degrees to 100 degrees, 101 degrees to 110 degrees, 111 degrees to 120 degrees, 121 degrees to 130 degrees, 131 degrees to 140 degrees, 141 degrees to 150 degrees, 151 degrees to 160 degrees, 161 degrees to 170 degrees, or 171 degrees to 180 degrees. Such an offset angle is advantageously also provided between the first inflow bore 24 and the outflow bore 25.

The switching element 22 furthermore has a recess 36, which is illustrated by dashed lines in FIG. 2. In the embodiment illustrated in FIG. 2, the switching module 21 is situated in a first position, wherein the recess 36 connects the first inflow bore 24 in fluid-conducting fashion to the outflow bore 25. Furthermore, the switching element 22 has an edge region 37 adjoining the recess 36. In this embodiment, the edge region 37 extends around the entire circumference of the switching element 22 with the exception of the recess 36. In the first position of the switching module 21, the edge region 37 shuts off a fluidic connection between the outflow bore 25 and the second inflow bore 26.

The offset angle 35 of approximately 60 degrees particularly advantageously yields an increase of the sealing length between the second inflow bore 26 and the outflow bore 25. A greater sealing length gives rise, in particular, to a greater sealing action between the respective inflow bores and the outflow bore.

Figure 3:
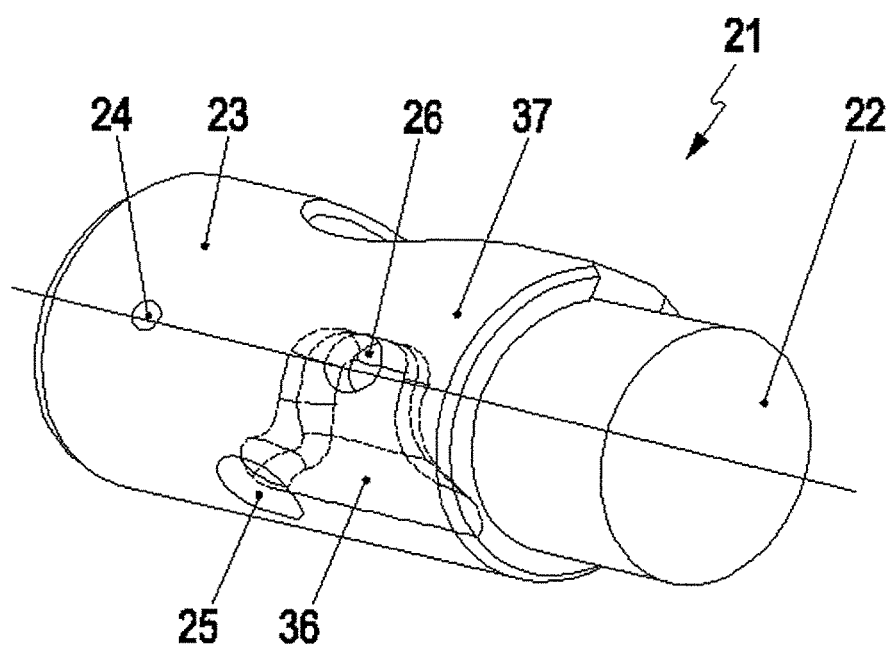
FIG. 3 shows the switching module from FIG. 2 in a second position.

FIG. 3 shows the switching module 21 in a second position, wherein, in the second position, the recess 36 and the sleeve 23 connect the second inflow bore 26 in fluid-conducting fashion to the outflow bore 25. Furthermore, the edge region 37 and the sleeve 23 shut off a fluidic connection between the first inflow bore 25 and the outflow bore 25.

In a particular embodiment, the first inflow bore 24 is connected to the first hydraulic line 5 from FIG. 1 and the second inflow bore 26 is connected in fluid-conducting fashion to the second hydraulic line 6 from FIG. 1. In the embodiment shown in FIG. 2 and FIG. 3, the recess 36 is rounded and formed in the shape of a "T". It is preferable for a first region of the recess 36, which first region directly adjoins the outflow bore 25, to be longer in a direction parallel to the longitudinal axis 28 of the sleeve 23 than a second region which, depending on the position of the switching module 21, adjoins the first inflow bore 24 or the second inflow bore 26. Said different lengths of the first and second regions of the recess 36 preferably form the "T" shape.

Figure 4:
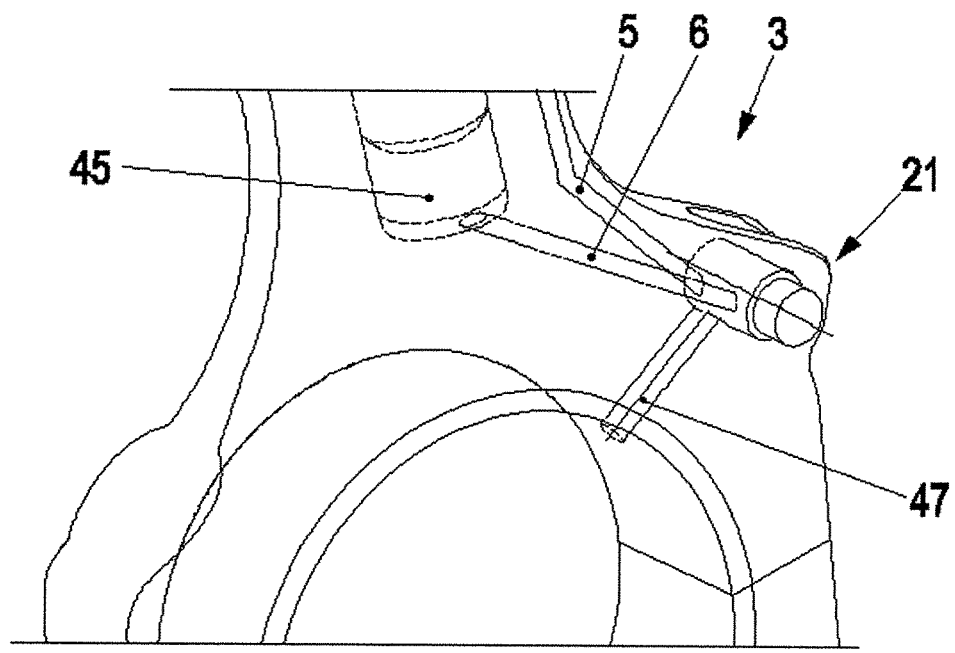
FIG. 4 shows an arrangement of the switching module from FIG. 2 on a connecting rod from FIG. 1.

FIG. 4 shows the switching module 21 such as is arranged on the connecting rod 3, preferably in a connecting rod foot region 42. In the illustration shown in FIG. 4, the switching module 21 is situated in the same position as that illustrated in FIG. 3. Here, the switching module 21 connects the second hydraulic line 6 in fluid-conducting fashion to the outflow bore 25, and to a hydraulic outflow duct 47 which is connected in fluid-conducting fashion to the outflow bore 25. In the position of the switching module 21 as shown in FIG. 4, the edge region 37 and the sleeve 23 shut off a fluidic connection between the first hydraulic line 5 and the outflow bore 25 and thus the hydraulic outflow duct 47. The hydraulic outflow duct 47 forms a fluidic connection to the connecting rod bearing, to which the fluid flowing through the switching module 21 can flow out. In a refinement, the hydraulic outflow duct 47 may be formed as a direct opening to the interior of the crankcase 2.

The first hydraulic line 5 is connected in fluid-conducting fashion to the first working chamber 45. The second hydraulic line 6 is connected in fluid-conducting fashion to the second working chamber 46.

Figure 5:
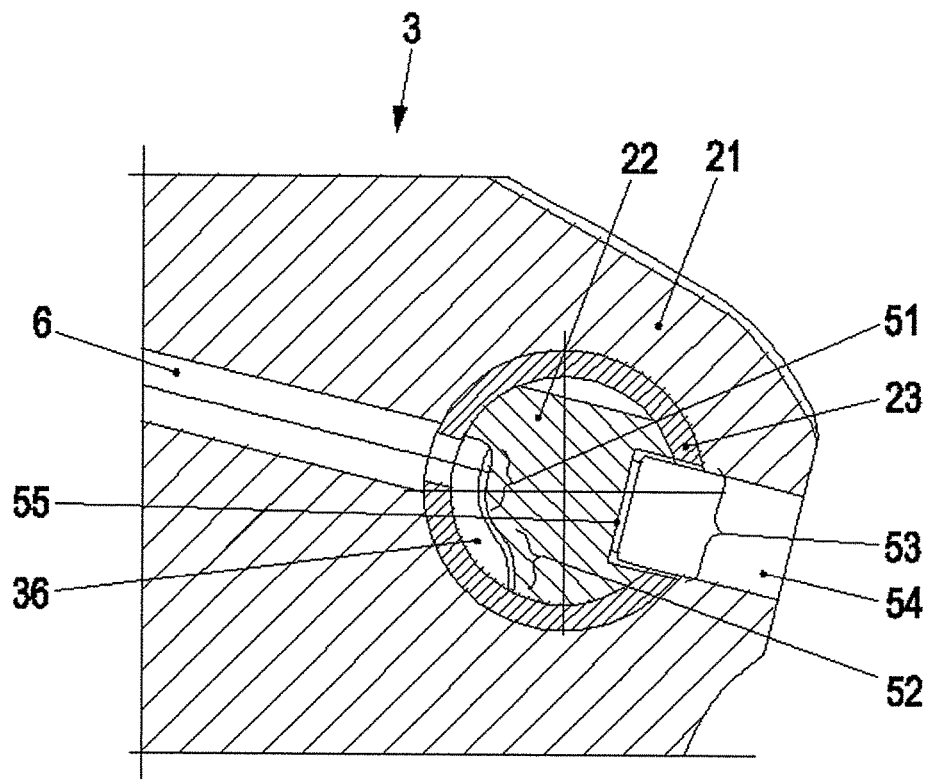
FIG. 5 shows a sectional view of the switching module from FIG. 2.

FIG. 5 shows the switching module 21 in a section plane perpendicular to the longitudinal axis 28 of the sleeve 23 in a plane running through a central line of the second hydraulic line 6 in FIG. 4. As already described, the recess 36 can be divided into a second region 51 which is shorter, along the longitudinal axis 28, than a first region 52. In the illustration shown in FIG. 5, the recess 36 connects the second hydraulic line 6 in fluid-conducting fashion to the outflow bore 25. The outflow bore 25 is not visible in the sectional view shown in FIG. 5.

The sleeve 23 may have a receptacle 53 for a stop pin 54. The switching element 22 advantageously has a stop pin receptacle 55, which is preferably in the form of a groove. The stop pin 54 serves preferably as an end stop of the switching element 22 in the first and/or second position of the switching module 21. Here, the stop pin receptacle 55 may abut against the stop pin 54 in the respective first and second position. One refinement provides that the switching element 22 has a clearance with respect to the stop pin 54 in the first and/or second position of the switching module 21, wherein the stop pin 54 prevents the switching element 22 from being pushed out of the connecting rod 3.

Furthermore, the stop pin 54 may be designed as a displacement prevention means and fixing element of the sleeve 23. For example, a clearance between the stop pin 54 and the receptacle 53 may be designed to be considerably smaller than a clearance between the sleeve 23 and the connecting rod 3. The clearance between the sleeve 23 and the connecting rod 3 can be eliminated during the installation of the stop pin 54.

The stop pin 54 particularly preferably combines a function as an end stop of the switching element 22 in at least one position, the first or the second position, of the switching module 21 with a function as a displacement prevention means and fixing element of the sleeve 23. In this way, secure seating of the sleeve 23 in the connecting rod 3 with a slight interference fit or even a clearance fit can be ensured, whereby the clearance of a sliding seat of the switching element 22 with respect to the sleeve 23 can be configured with greater precision. This is associated in particular with the fact that, with a less intense interference fit of the sleeve 23 in the installed state in the connecting rod 3, the sleeve 23 exhibits reduced deformation. Said reduced deformation permits simpler manufacture of the sleeve 23 and of the switching element 22. Furthermore, not only simpler manufacture but also simpler assembly of the sleeve 23 and of the switching element 22 is made possible. A reduction in intensity of the interference fit of the sleeve 23 in the installed state in the connecting rod 3 can in particular reduce the requirements with regard to manufacturing tolerances of the sleeve 23 and of the switching element 22.

Figure 6:
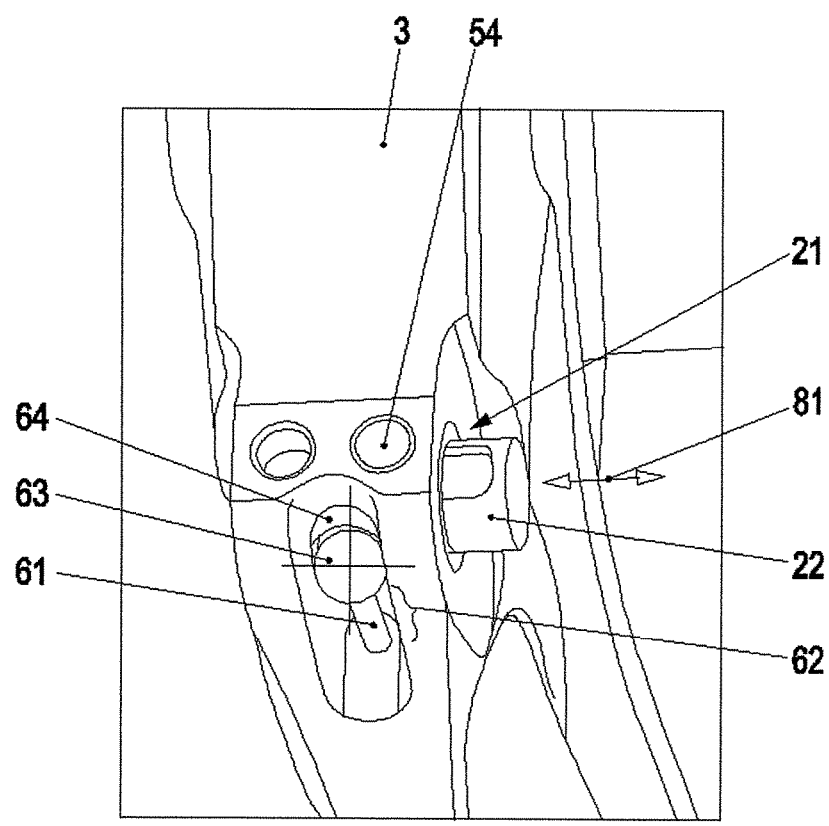
FIG. 6 shows a perspective view of the switching module and of a fixing device.

FIG. 6 shows the switching module 21, which is arranged on the connecting rod 3, in a position corresponding to the position of the switching module 21 shown in FIG. 2. In this embodiment, the connecting rod 3 has a fixing device 61. The fixing device 61 illustrated in FIG. 6 is preferably in the form of a detent spring, wherein an upper end 62 of a bending spring of the detent spring and a spherical end 63 of the bending spring are illustrated in FIG. 6. In the position of the switching module 21 shown in FIG. 6, the spherical end 63 of the fixing device 61 exerts a holding force on a preferably shell-shaped receptacle 64 of the switching element 22. Said holding force causes the switching element 22 to be held in the position shown in FIG. 6, but does not hold the switching element counter to a switching impetus with which the switching element 22 by way of a switching means, such as is shown for example in FIG. 1 by way of the switching means 8.

Figure 7:
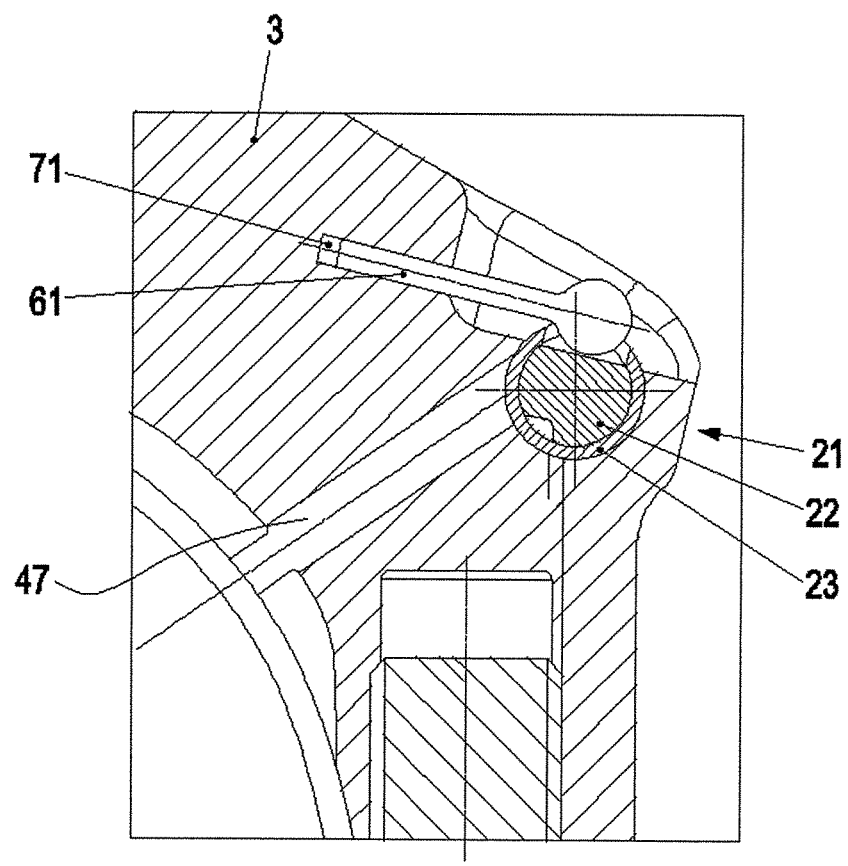
FIG. 7 shows the switching module and the fixing device in a sectional view.

FIG. 7 shows the switching module 21 and the fixing device 61 in a sectional view through the central line of the spherical end 63 of the fixing device 61 and perpendicular to the longitudinal axis 28 of the sleeve 23. It is particularly advantageously possible, after the connecting rod 3 has been forged or sintered, for the fixing device 61 to be slid into a recess 71 of the connecting rod 3. It is preferably possible for an imprecision of the recess 71, of the sleeve 23 and/or of the switching element 22 arising from the manufacturing process to be compensated by way of a corresponding flexural stiffness of the fixing device 61, which is designed preferably as a detent spring. In other words, a manufacturing tolerance of the sleeve 23, of the switching element 22 and/or of the recess 71 can be compensated by way of the fixing device 61.

As can be seen from FIGS. 5 and 6, the switching element 22 is blocked by the stop pin 54 at least in one direction along the double arrow 81 (see FIG. 6). Furthermore, in this position of the switching element 22, the stop pin receptacle 55 extends into a region which lies outside the sleeve 23. The stop pin 54 is pressed into the connecting rod 3 preferably after the sleeve 23 and the switching element 22 have been slid in.

In said position of the switching module 21, it is made possible for the fluid, preferably the engine oil which from a working chamber which by way of gas forces which act on the connecting rod 3 during the operation of the internal combustion engine 1, to flow out into a connecting rod bearing. The engine oil flows out through the first inflow bore 24 of the sleeve 23, through the recess 36 and through the outflow bore 25, preferably in the direction of a connecting rod bearing. The inflow bore 24 serves, in the same manner, as a throughflow aperture.

The shape of the recess 36 is selected such that, independently of the position of the switching module 21, the recess 36 always produces only one fluidic connection from one inflow bore, the first inflow bore 24 or the second inflow bore 26, to the connecting rod bearing, and at the same time closes off the respective other inflow bore. By means of the T-shaped design of the recess 36 and the offset angle 35, relatively large sealing lengths in relation to the prior art are made possible between the respective inflow bores 24 and 26 and the outflow bore 25.

In said position, it is made possible for the fluid, preferably the engine oil, which originates from a working chamber of the connecting rod 3, which working chamber is moved by way of inertia forces moving connecting rod 3 during the operation of the internal combustion engine 1, to flow out into the connecting rod bearing. The engine oil flows through the second inflow bore 26, through the recess 36 and out through the outflow bore 25 in the direction of the connecting rod bearing. The inflow bore 26 may likewise be designed as a throughflow aperture. The second inflow bore 26 is preferably of greater diameter than the first inflow bore 24. This may be advantageous for example owing to a first pressure in the first working chamber 45, the volume of which is varied by way of the inertia forces, in relation to a second pressure, which is higher than the first, in the second working chamber 46, the volume of which is varied by way of the gas forces.

The invention claimed is:

1. An internal combustion engine having a settable variable compression ratio and having a connecting rod, which connecting rod has an adjustment mechanism for the adjustment of the settable variable compression ratio, a first hydraulic line, a second hydraulic line, a hydraulic outflow duct and a switching module for the switching of the adjustment mechanism, wherein the switching module is arranged on the connecting rod and a first position of the switching module corresponds to a first compression ratio and a second position of the switching module corresponds to a second compression ratio that differs from the first compression ratio, the switching module has a switching element and a sleeve surrounding the switching element, wherein the switching element and the sleeve are movable relative to one another, and the switching element has a recess and an edge region bordering the recess, wherein, in the first position of the switching module, the recess and the sleeve connect the first hydraulic line in fluid-conducting fashion to the hydraulic outflow duct, and the edge region and the sleeve shuts off a fluidic connection between the second hydraulic line and the hydraulic outflow duct, and in the second position of the switching module, the recess and the sleeve connect the second hydraulic line in fluid-conducting fashion to the hydraulic outflow duct, and the edge region and the sleeve shuts off a fluidic connection between the first hydraulic line and the hydraulic outflow duct.

2. The internal combustion engine according to claim 1, characterized in that the sleeve is arranged so as to be immovable relative to and/or in the connecting rod, and the switching element is arranged so as to be displaceable relative to and/or in the sleeve.

3. The internal combustion engine according to claim 1, characterized in that the switching element is formed in the manner of a bolt and is arranged concentrically in the sleeve.

4. The internal combustion engine according to claim 1, characterized in that the sleeve has at least one first passage and one second passage, wherein the first passage is arranged offset with respect to the second passage in a projection plane which is perpendicular to a longitudinal axis of the sleeve.

5. The internal combustion engine according to claim 1, characterized in that the connecting rod has a stop pin by means of which the switching element, in a stop position and/or in the first and/or second position, is blocked at least in one direction.

6. The internal combustion engine according claim 1, characterized in that the stop pin fixes the sleeve relative to the connecting rod.

7. The internal combustion engine according to claim 1, characterized in that the connecting rod has a fixing device for fixing the switching element in the first and/or second position.

8. The internal combustion engine according to claim 7, characterized in that the fixing device is in the form of a detent spring.

9. The internal combustion engine according to claim 7, characterized in that the fixing device is in the form of a magnetic locking means.

10. The internal combustion engine according to claim 7, characterized in that the fixing device is in the form of a hydraulic locking means.

11. A connecting rod having an adjustment mechanism for the adjustment of a settable variable compression ratio of an internal combustion engine, comprising:
a first hydraulic line, a second hydraulic line, a hydraulic outflow duct and a switching module for the switching of the adjustment mechanism, wherein the switching module is arranged on the connecting rod and a first position of the switching module corresponds to a first position of the adjustment mechanism and a second position of the switching module corresponds to a second position of the adjustment mechanism that differs from the first position of the adjustment mechanism, the switching module has a switching element and a sleeve surrounding the switching element, wherein the switching element and the sleeve are movable relative to one another, and the switching element has a recess and an edge region bordering the recess, wherein, in the first position of the switching module, the recess and the sleeve connect the first hydraulic line in fluid-conducting fashion to the hydraulic outflow duct, and the edge region and the sleeve shuts off a fluidic connection between the second hydraulic line and the hydraulic outflow duct, and in the second position of the switching module, the recess and the sleeve connect the second hydraulic line in fluid-conducting fashion to the hydraulic outflow duct, and the edge region and the sleeve shuts off a fluidic connection between the first hydraulic line and the hydraulic outflow duct.

12. The sleeve for insertion in a connecting rod according to claim 11, having a receptacle for a stop pin, a first passage for the first hydraulic line, a second passage for the second hydraulic line, and a third passage for the hydraulic outflow duct.

* * * * *